June 11, 1957 W. HAUG 2,795,666
FEELER HEAD
Filed Jan. 18, 1954
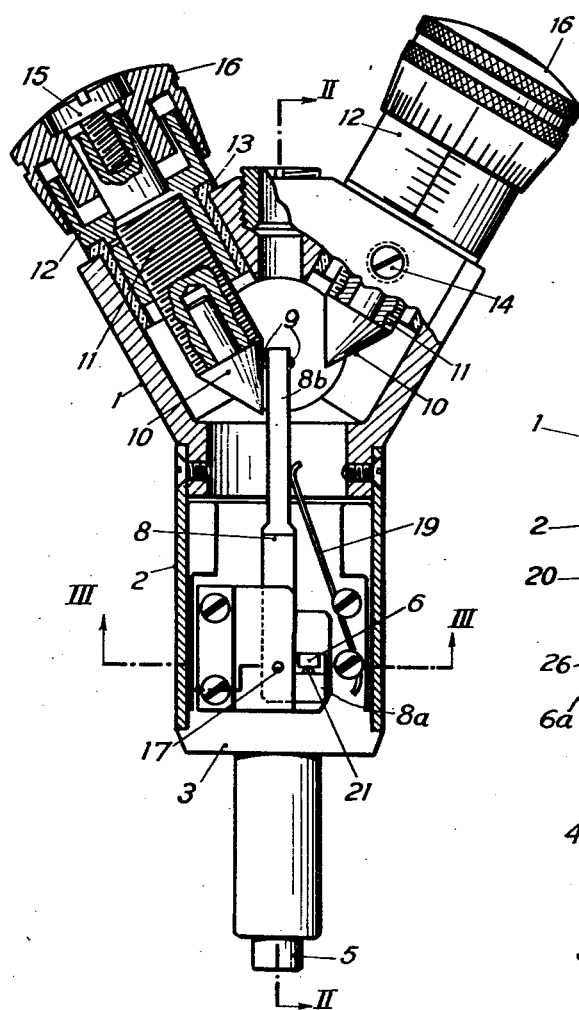
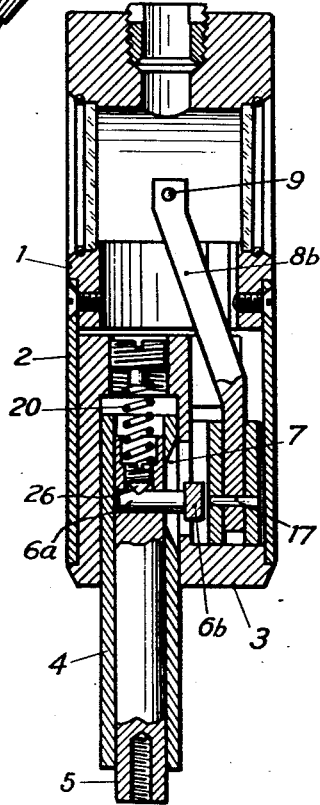
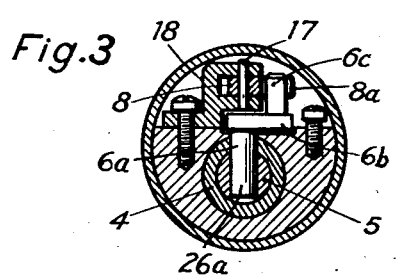
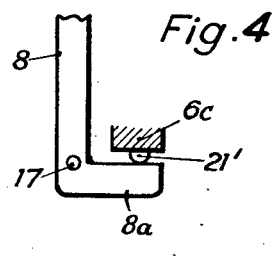
INVENTOR:
WILHELM HAUG
BY:

United States Patent Office 2,795,666
Patented June 11, 1957

2,795,666
FEELER HEAD

Wilhelm Haug, Mulhouse, France, assignor to Manufacture de Machines du Haut-Rhin, Mulhouse, France Application January 18, 1954, Serial No. 404,761

Claims priority, application Germany January 16, 1953

3 Claims. (Cl. 200—61.41)

This invention is concerned with a precision electric feeler head having an oscillating contact lever and opposed contacts for the purpose of directly regulating tolerance ranges.

The known feeler heads that operate according to the contact method require the existence therein of precisely regulatable controlling end parts because, particularly in the case of close tolerances, the tolerance limits, which must be rendered apparent by means of luminous or other signals, must be regulated very accurately to avoid restrictions, by exaggerated inaccuracies of regulation, of the tolerance range available. The advantage, over fixed gauges, which results from the employment of such feeler heads permitting the total utilization of the complete tolerance range, without limitation, for finishing purposes, would be lost, because of excessive inaccuracies of regulation, unless the inaccuracies of regulation are maintained between the close limits of transition from "good" to "waste" that may be obtained by the said method. This requires use of very expensive regulation controlling parts of which at least two, if not four, are necessary, one for upper measurement and one for lower measurement of each of the tolerance limits.

However, measurement regulating end control parts executed with precision render the method costly, in particular when relatively small numbers of finished pieces are dealt with, whereby a new adjustment of the feeler heads is frequently called for. It results therefrom that this test method is frequently rendered insufficiently economical by the multiplicity of nominal dimensions that are necessary.

The present invention provides a feeler head effectively operable independently of such regulation controlling parts, or at least notably limiting the need for these parts.

It has already been proposed, in the feeler heads, to form the adjusting screws, employed for regulating the tolerance limits, as cylinders which, like in micrometers, have graduations with vernier, which correspond from line to line to a determined displacement of the feeler stem, for example to $^{10}/_{1000}$ of an inch, and which may be employed for regulating the tolerance limit. Here there is necessary only one adjustment controlling part with accurately calculated nominal value. The regulation controlling cylinders require, in these instruments, a considerable space as compared to the ordinary feeler heads, and it results therefrom that positioning thereof on machine tools, and in particular on various test apparatus, presents difficulties and may even be impossible. To insure for such instrument, suitable for directly regulating tolerance range, the same adaptability as for the simple feeler heads, the instrument is constructed, according to the present invention, in such way that the opposed contacts have the form of cones and are affixed directly to regulating threaded rods the axis of which, form an angle equal to the apex angle of said cones. The particular conformation of the opposed contacts, in combination with the inclined disposition at a certain angle, permits a new increment of the transmission ratio which in turn permits diminishing of the longitudinal dimensions of the feeler head.

The invention will be more clearly understood by referring to the accompanying drawings which show, by way of example, an embodiment of the invention and in which:

Fig. 1 is an elevational sectional view showing a feeler head according to the present invention, with parts broken away;

Fig. 2 is a section along the line II—II of Fig. 1;

Fig. 3 is a section along the line III—III of Fig. 1; and

Fig. 4 is a modification of the form of apparatus shown in Fig. 1.

Similar numerals refer to similar parts throughout the several views.

The feeler head shown comprises a box 1, a tubular casing member 2, a supporting plate 3, and a link member 6 located in the member 2. In the support 3 there is located a sleeve 4 which receives a longitudinally displaceable feeler stem 5. The link member 6 includes a pair of offset pins 6a and 6c rigidly connected to a transverse member 6b. The pin 6a is inserted through an opening 7 in casing 4 into a bore in the feeler stem 5 and is prevented from rotating therein by a set screw 26 located in a recess 26a formed in the pin 6a. Pins 6a and 6c move with the feeler stem 5. The offset portion 6c rests on the short arm 8a of a bent lever 8 whose long arm 8b carries two contacts 9, preferably hemispheric in shape, which contacts cooperate with fixed opposed contacts 10. The opposed contacts 10 are in the form of cones accurately machined from suitable contact material and are affixed to the ends of regulating threaded rods 11 each of which forms, with the plane of symmetry of the instrument containing the pivotal axis of the bent lever 8, an angle equal to the apex angle of the corresponding cone 10. The threaded rods 11 are disposed in sleeve-nuts 12 which in turn are disposed in insulating sleeves 13 and have, disposed perpendicularly to the median line, graduations analogous to those of a micrometer screw. The sleeve-nuts 12 are formed with resilient upper walls that may be compressed by means of set screws 14 so as to eliminate the play of rod threads. Affixed to the upper ends of rods 11 by means of screws 15 are milled cylindric parts 16 overlapping the sleeve-nuts 12. The parts 16 have, on their periphery, verniers with the aid of which there is determined, to the desired degree, the limitation of the oscillating motion of the long arm 8b of the bent lever 8 and of contacts 9 affixed to this arm.

Because of the inclination of the threaded rods 11, in combination with the conical shape of the opposed contacts 10, the transmission ratio is adjusted in the following way:

When the threaded rods 11 form an angle of 30° with respect to the vertical axial line of the feeler head, that is, an angle of 60° between them, the contact cones 10 must also present the apex angles of 60°. Then the generating surfaces of the cones 10 which face the contact lever 8 are parallel to the axial line (II—II in Fig. 1). The longitudinal shifting of the threaded rods 11, determined by the rotation of the cylindric parts 16, moves the generating surfaces of the cones toward or away from the long arm 8b of the bent lever 8 carrying the contacts 9, so that this shifting is rendered utilizable for limitation of the oscillating motion. If the screw pitch is for example 0.5 mm. and if the cylinder periphery is divided into 25 graduations, the threaded rod, if it is continuously turned from line to line of graduation, moves longitudinally an amount of $0.5/25 = 0.02$ mm. Because of its inclination, the generating surface of the cone 10 then moves toward the contact lever only an amount of $0.02 \sin 30° = 0.01$ mm. For a ratio in the order of 1:10 between both arms of the bent lever 8, the oscillation of the contact of 0.01 mm. corresponds to a displacement of 0.001 mm. of the feeler stem. But this displacement, for a cylinder periphery divided into 25 graduations and for a pitch of 0.5 mm., corresponds to the longitudinal displacement of the threaded rod 11 of 0.02 mm., so that there is thus obtained a total transmission of 0.02 mm., so that there is thus obtained a total transmission ratio of 0.02/0.001=20, that is 1 to 20. Because of this fact, the bent lever 8 may, despite the high transmission ratio, be better proportioned than heretofore. This is extremely desirable in order to avoid eventual own oscillations. Further, the total length of the feeler head is reduced and, substantially, does not exceed that of an ordinary feeler head.

The bent lever 8 is mounted to oscillate on a pivot pin 17 housed in a forked support 18 affixed to the plate 3 by means of screws. This pivot pin 17 is located in a plane of symmetry of the feeler head and the long arm 8b of the bent lever 8 is so curved that its contacts 9, when it oscillates about the pivot 17, move in a plane of symmetry of the feeler. A flat spring 19 applies laterally against the lever 8 whereas a coil spring 20 acts upon the upper end of the feeler stem 5. The expansion of these two springs is adjustable by means of screws, and they act upon the transmission device in inverse sense; they may be adjusted in respect to each other so as to enable the bent lever 8 to follow exactly all the motions of the feeler stem.

Because the axis of oscillation of the pivot pin 17 is placed in the plane of symmetry of the head, the oscillating motion of the contacts of lever 8, that correspond to displacement of the feeler stem, will be equal on both sides. This permits the two regulating cylindrical elements to be alike and not different from each other in construction.

The pin 6c of the linking member 6 has a thoroughly flat face oriented downwards and applying against a spherical abutment 21 thoroughly polished and wear-resisting and carried by the short arm 8a of the bent lever 8. For an exactly vertical position of the long arm 8b of the bent lever 8, on the median axis of the feeler head, the highest point of the spherical abutment 21 is on the horizontal line that passes through the axis of oscillation 17 which in turn is also exactly on the vertical median axis of the feeler head. The reciprocal adjustments of the parts have for their effect that, when the feeler stem 5 is in operation, the spherical abutment 21 describes a circular arc about the point 17 on the plane face of the pin 6c.

The elements that serve to transmit the motion of the feeler stem 5 to the bent lever 8 may also be disposed inversely, that is, a spherical abutment 21' then is located upon the lower face of the pin 6c and rests on a plane face provided on the short arm 8a of lever 8, as shown in Fig. 4. In this case, when the feeler stem 5 is in motion causing the oscillating motion of the bent lever 8, the spherical abutment describes on the plane face of arm 8a a rectilinear motion prescribed by the feeler stem 5.

The oscillating motion of the pin 6a, generated in both cases by the rectilinear motion of the feeler stem 5, is not, as shown by calculation, constant with respect to the oscillating motion of the long arm 8b, utilized for establishing the contact as described. The study of the conditions by calculations shows that the oscillating motions of the contacts 10 that correspond to determined displacements of the feeler stem 5 become increasingly greater when the pin 6a is formed with a plane face, as the highest point of the spherical abutment 21 moves away from the median horizontal line. With the inverse disposition, when the short arm 8a of lever 8 carries the plane face, the oscillating contact motions that correspond to the displacements of the feeler stem become smaller. As long as one deals with motions which move the bent lever 8 away from the shown median position only slight amounts, the modification of the transmission ratio may be neglected because it is very small. The difference in the movements which depend on one another and are simultaneously accomplished by the feeler stem 5 and the contacts 9 on the long arm 8b of the bent lever 8, depends in both positions, depending on whether arm 8 or pin 6c, carries the face on the magnitude of the radius of spherical abutment 21 (21'). When this radius increases, the utilizable transmission range, practically free from errors, is reduced but the insensitivity of the instrument to intervening external forces increases.

Inversely, the range free from errors becomes enlarged by diminution of the radius, and an infinitely small radius is practically equivalent to a knife blade. But then the instrument is very sensitive to shocks. In any case, there is thus available a means for adjusting according to the employment proposed, the instrument strength and the measurement range; the possibility of correcting the plane face facing the spherical abutment 21 is an additional advantage. This gives to the feeler head, which is to be adjusted directly with the aid of the graduations, its particular value in the sense that the measurement range, with a transmission of the displacement of the feeler stem completely free from errors, and also with a strength that suffices even in the case of a rough manipulation, may be maintained sufficiently great to respond to all needs concerning its economical value.

The invention is not restricted to the particular forms of execution described and shown, as modifications may be made therein substantially without departing from the scope of the invention. Thus, there may be employed other cone apex angles, for example 45° and 60°, and other angular positions of the regulating threaded rods; there would result therefrom other corresponding transmission ratios.

What is claimed is:

1. Precision feeler head of the character described comprising, in combination, a feeler stem, a pivoted transmission lever cooperating with the non-feeling end of said feeler stem and adapted to transform into oscillation displacements the axial displacements of said feeler stem, two contacts carried by the free end of said lever on opposed sides of said lever and in the same plane of oscillation, two conical opposed contacts adapted to cooperate with said two first contacts, two shiftable rods each of which supports one of said conical contacts, the axes of said rods forming together an angle equal to the apex angle of said conical contacts and the axis of each of said rods forming with a plane of symmetry containing the pivotal axis of said transmission lever an angle equal to the half apex angle of said conical contacts.

2. Precision feeler head according to claim 1 in which the apex angle of the conical contacts and the angle comprised between the axes of the shiftable rods is 60° and the angle of the axis of each rod with a plane of symmetry containing the pivotal axis of the transmission lever is 30°.

3. Precision feeler head of the character described comprising, in combination, a cylindrical casing, a plate fixed to one end of said cylindrical casing, a tubular sleeve the axis of which is parallel to the axis of said cylindrical casing passing through said plate and being fixed thereto, a spring-loaded stem slidably located in said sleeve, a link member having two offset pins, one pin being located in a perforation of said feeler stem perpendicularly to the same, a bent lever pivotally and radially mounted in said casing, one arm of said bent lever cooperating with the other pin of said link member, contacts placed on both sides of the free end of said bent lever and oscillating in a diametral plane of said casing, a box fixed in the tubular casing and having two tubular extensions the axes of which are equally inclined with relation to the oscillating plane of said contacts, internally threaded sleeves fixedly located in said tubular extensions, threaded rods cooperating with said threaded sleeves, conical opposed contacts carried by said rods, the apex angle of the cones being equal to the angle of the axes of said tubular extensions, and vernier controlled means for rotating said threaded rods with relation to said threaded sleeves.

References Cited in the file of this patent

UNITED STATES PATENTS

| | | |
|---|---|---|
| 2,248,653 | Allendorff | July 8, 1941 |
| 2,267,559 | Foster | Dec. 23, 1941 |
| 2,715,165 | Matter et al. | Aug. 9, 1955 |

FOREIGN PATENTS

| | | |
|---|---|---|
| 594,450 | Great Britain | Nov. 11, 1947 |
| 595,480 | Germany | Apr. 14, 1934 |